(12) United States Patent
Kechagia et al.

(10) Patent No.: US 9,772,139 B2
(45) Date of Patent: *Sep. 26, 2017

(54) PURIFICATION OF ARGON THROUGH LIQUID PHASE CRYOGENIC ADSORPTION

(71) Applicant: PRAXAIR TECHNOLOGY, INC., Danbury, CT (US)

(72) Inventors: Persefoni E. Kechagia, Williamsville, NY (US); Neil A. Stephenson, East Amherst, NY (US); Philip A. Barrett, Tonawanda, NY (US); Hai Du, East Amherst, NY (US); Steven J. Pontonio, Eden, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/948,959

(22) Filed: Nov. 23, 2015

(65) Prior Publication Data

US 2016/0084571 A1    Mar. 24, 2016

Related U.S. Application Data

(63) Continuation of application No. 13/782,636, filed on Mar. 1, 2013, now Pat. No. 9,222,727.

(51) Int. Cl.
*F25J 3/00* (2006.01)
*F25J 3/08* (2006.01)
(Continued)

(52) U.S. Cl.
CPC ............. *F25J 3/08* (2013.01); *C01B 23/0052* (2013.01); *C01B 23/0068* (2013.01);
(Continued)

(58) Field of Classification Search
None
See application file for complete search history.

(56) References Cited

U.S. PATENT DOCUMENTS 3,996,028 A    12/1976  Golovko et al.
4,477,265 A    10/1984  Kumar et al.
(Continued)

FOREIGN PATENT DOCUMENTS

CA    2243389 A1    1/1999
EP    0 514 163 A2   11/1992
(Continued)

OTHER PUBLICATIONS

Federov, A.N., "Investigation and Improvement of Cryogenic Adsorption Purification of Argon from Oxygen", Gas Separation & Purification, vol. 9, No. 2, pp. 137-145, XP055121716, ISSN: 0950-4214, DOI: 10.1016/0950-4214(95)93951-F.

*Primary Examiner* — Chester Barry
(74) *Attorney, Agent, or Firm* — Iurie A. Schwartz

(57) ABSTRACT

The invention relates to a process for removing oxygen from liquid argon using a TSA (temperature swing adsorption) cyclical process that includes cooling an adsorbent bed to sustain argon in a liquid phase; supplying the adsorbent bed with a liquid argon feed that is contaminated with oxygen and purifying the liquid argon thereby producing an argon product with less oxygen contaminant than is in the initial liquid argon feed; draining the purified residual liquid argon product and sending purified argon out of the adsorbent bed. Regeneration of specially prepared adsorbent allows the adsorbent bed to warm up to temperatures that preclude the use of requiring either vacuum or evacuation of adsorbent from the bed.

14 Claims, 1 Drawing Sheet

(51) Int. Cl.
*C01B 23/00* (2006.01)
*F25J 3/04* (2006.01)

(52) U.S. Cl.
CPC ....... *C01B 23/0078* (2013.01); *F25J 3/04733* (2013.01); *C01B 2210/0021* (2013.01); *C01B 2210/0034* (2013.01); *C01B 2210/0045* (2013.01); *F25J 2205/60* (2013.01); *F25J 2220/44* (2013.01)

(56) References Cited

U.S. PATENT DOCUMENTS

| | | | |
|---|---|---|---|
| 4,717,406 A | 1/1988 | Giacobbe | |
| 5,159,816 A | 11/1992 | Kovak et al. | |
| 5,174,979 A | 12/1992 | Chao et al. | |
| 5,601,634 A | 2/1997 | Jain et al. | |
| 5,685,172 A | 11/1997 | Darredeau et al. | |
| 5,730,003 A * | 3/1998 | Nguyen | B01D 53/047 62/648 |
| 5,784,898 A | 7/1998 | Gary | |
| 6,083,301 A * | 7/2000 | Gary | B01D 53/02 95/130 |
| 6,572,838 B1 | 6/2003 | Sebastian et al. | |
| 7,294,172 B2 | 11/2007 | Baksh et al. | |
| 7,452,407 B2 * | 11/2008 | Golden | C01B 3/56 95/102 |
| 7,501,009 B2 | 3/2009 | Graham et al. | |
| 9,222,727 B2 * | 12/2015 | Kechagia | F25J 3/08 |
| 2012/0141868 A1 | 6/2012 | Hirano | |
| 2014/0245781 A1 | 9/2014 | Kechagia et al. | |
| 2014/0245782 A1 | 9/2014 | Barrett et al. | |
| 2014/0249023 A1 | 9/2014 | Barrett et al. | |

FOREIGN PATENT DOCUMENTS

| | | |
|---|---|---|
| EP | 0 893 156 A2 | 1/1999 |
| EP | 1 291 067 A2 | 3/2003 |
| WO | WO 2011024687 A1 | 3/2011 |

\* cited by examiner

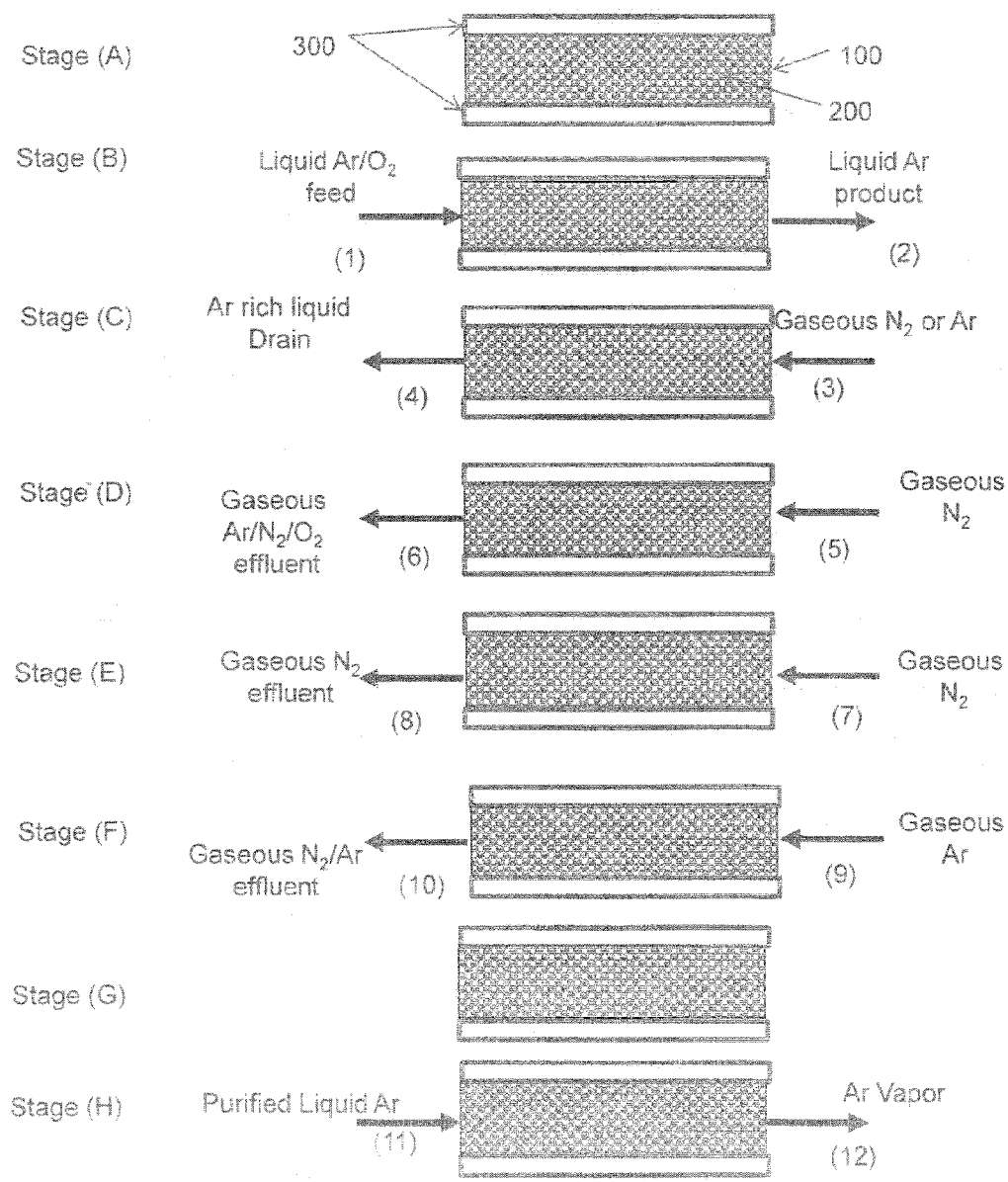

PURIFICATION OF ARGON THROUGH LIQUID PHASE CRYOGENIC ADSORPTION

CROSS REFERENCE TO RELATED APPLICATION(S)

This application is a continuation application of U.S. Patent application Ser. No. 13/782,636 filed on Mar. 1, 2013, now issued U.S. Pat. No. 9,222,727, and entitled PURIFICATION OF ARGON THROUGH LIQUID PHASE CRYOGENIC ADSORPTION.

FIELD OF THE INVENTION

The present invention relates to the use of cyclic adsorption processes for the removal of oxygen required for the purification of liquid argon. More specifically, the invention relates to the process steps, conditions, and adsorbents to purify a liquid argon stream of oxygen. The present invention also describes an optimal and economically attractive lower energy consumption process for obtaining a commercially viable liquid argon product. In addition, the invention also provides the identification of an optimal adsorbent for use in this purification process. This purification process can be integrated with an air separation plant or unit (ASU), under field service relevant conditions.

DESCRIPTION OF RELATED ART

Successful development of a cyclic adsorption process to achieve removal of low concentrations (i.e., in the range of parts per million) of oxygen from liquid argon, requires the identification of a suitable adsorbent as well as the development and optimization of the adsorption process steps.

The removal of low concentrations of oxygen from argon is considered to be a purification process and is necessary for many end users of argon where the presence of oxygen in the argon is undesirable. In many instances where safety, handling, and the industrial or laboratory use of argon in either a liquid or gaseous state occurs, the purity of argon is important. Argon is colorless, odorless, and nontoxic as a solid, liquid, and gas. Argon is chemically inert under most conditions. As an inert noble gas, it possesses special properties desirable for applications related to the semiconductor industry, lighting, and other types of gas discharge tubes, welding and other high-temperature industrial processes where ordinarily non-reactive substances become reactive. Oxygen, in contrast to argon, is a highly reactive substance (in gaseous or liquid form) and is often a safety concern in that it supports combustion. Even low levels of oxygen (<100 parts per million) are many times not acceptable for certain laboratory and industrial processes. This also includes the chemical processing industry where certain reactions must be carried out primarily in the absence of oxygen. Cost considerations for the purification of argon have been a driving influence in the development of special cryogenic systems over at least several decades, and finding a suitable process which is robust, reliable, and meets the economic criteria necessary for customer demand has been sought. Production of liquid argon via cryogenic distillation is well known and is the preferred method of producing high purity argon.

Adsorption processes have also been described for the purification of argon, however, these have in general been limited to gas phase using 4A adsorbents and involved expensive energy intensive adsorption processes. For example, considerable cost is added to the adsorption process whenever an evacuation step is required. The adsorption process step of regeneration that requires vacuum has been historically very energy intensive in that vacuum processing requires special equipment and other additional peripherals leading to much higher energy demands as well as the addition of undesirable but necessary capital and operating expenses.

In the related art, U.S. Pat. No. 3,996,028 provides for purification of argon using an adsorption process to remove oxygen impurities by passing a contaminated argon stream through synthetic zeolites of the A type at cryogenic temperatures. The document provides for vacuum treatment as a necessary step for desorption of oxygen from the zeolite following a warm-up regeneration step. Moreover, during the adsorption step the argon feed is in the gaseous phase and, the purified argon product provided is in the gas phase.

U.S. Pat. No. 4,717,406 describes the on-site adsorption of impurities contained in liquefied gases by passing liquefied gases through an activated adsorbent material at cryogenic temperatures and pressures for a time sufficient to permit adsorption. However, a necessary component of this process includes filters upstream and downstream of the adsorbent bed. The examples that have been provided in this document pertain to the purification of liquefied oxygen gas from carbon dioxide as this comes in contact with an adsorbent bed which is initially at ambient temperature.

U.S. Pat. No. 5,685,172 describes a process for the purification of oxygen and carbon dioxide from a cold gas or liquid stream of at least 90 mol % of nitrogen, helium, neon, argon, krypton, xenon, or a mixture of these gases. To achieve this, the use of a porous metal oxide, such as hopcalite-like materials are required. The regeneration of these metal oxides requires a reducing agent, such as hydrogen, which increases the total operating cost of adsorption processes using these materials. The zeolites described in the present invention are different than hopcalite and do not require use of reducing agents for regeneration. More specifically, hopcalites are chemisorbents or catalysts where zeolites, however, are reversible physical adsorbents. In addition, hopcalite materials are largely non-crystalline. Any crystallinity associated with hopcalite is attributed to the $MnO_2$ component which is present mainly in amorphous form. In contrast, zeolites are crystalline materials.

U.S. Pat. No. 6,083,301 describes a PSA or TSA process for purifying inert fluids to at most 1 part per billion impurities for use in the field of electronics. This patent describes the use of hopcalite-like adsorbent for the capture of oxygen impurities from liquid streams.

U.S. Pat. No. 5,784,898 also describes a cryogenic liquid purification process by which the liquid to be purified is brought in contact with an adsorbent to permit the adsorption of at least one of its contaminants. It is disclosed that at least a portion of the adsorbent is maintained cold using purified cryogenic liquid in between two subsequent purification cycles. Clearly, regeneration of the adsorbent is not described as a step that is provided in between the purification cycles. According to U.S. Pat. No. 5,784,898, following the completion of the purification cycle, the adsorbent is kept cold by coming into direct contact with a portion of the purified cryogenic liquid until the next purification cycle. Regeneration of the adsorbent takes place after a number of purification cycles and after draining the cryogenic liquid from the reactor.

In short, there are several limitations associated with the commercial purification of argon using adsorption techniques that have been discussed in the related art for certain applications. These known processes have been deficient in meeting all the criteria addressed above, namely: delivering argon as a liquid with very low oxygen concentration in an economic, lower energy consuming process. Another disadvantage is the required use of vacuum, which further increases energy demand, capital expenditures, and maintenance, and also further reduces the robust nature of any of the currently used or known argon purification processes. Further drawbacks include the fact the adsorbent systems which use commercially available zeolites of the 4A type require relatively large adsorbent beds to accomplish the purification necessary and these adsorbent beds must be taken "off-line" for frequent regeneration prior to restarting purification. Additional drawbacks associated with the related art also include the use of hopcalite-like adsorbents that do not possess the required physico-chemical properties needed for simple adsorbent regeneration and require the use of hydrogen as a reducing agent which is costly. These related art processes are not optimal for large scale operation in ASUs that produce up to a couple of hundred tons of liquid argon on a daily basis in that the TSA process of the present invention is a liquid compatible, continuous cyclic process, using a modified zeolite adsorbent.

Unmet needs remain regarding manufacture of large scale liquid argon purification with low parts per million levels (down to or below 1 part per million is desirable) of oxygen using adsorption technology. This includes the development of an optimal, economic, and effective adsorbent regeneration scheme as well as adsorbents with maximum capacity for oxygen uptake and negligible uptake for argon, which enables the use of smaller adsorbent beds.

To overcome the disadvantages of the related art, it is an object of the present invention to describe a novel process for liquid argon purification. This includes the use of a Temperature Swing Adsorption (TSA) process. The adsorbent is effectively regenerated by removing most of the adsorbed oxygen, by purging with a warm nitrogen and/or argon stream to above cryogenic temperatures.

It is also an object of the present invention to provide for a specific combination of a TSA process cycle along with the use of special forms of zeolite 4A material for providing the most efficient required separation. Some of the related art discloses the use of hopcalite materials to purify oxygen contaminants from liquid argon (see, e.g., U.S. Pat. Nos. 5,685,172 and 6,083,301). The use of 4A zeolite materials is also described in the cited art (e.g., U.S. Pat. No. 3,996,028), but in applications where the purification process takes place in the gas phase and requires a vacuum pretreatment step for the regeneration of the adsorbent. In the present invention, there is no need for a vacuum pretreatment step. The purification takes place in the liquid phase, and the adsorbent has been modified to accommodate the requirements of the new and unique process.

Other objects and aspects of the present disclosure will become apparent to one of ordinary skill in the art upon review of the specification, drawings, and claims appended hereto.

SUMMARY OF THE INVENTION

The present invention describes a TSA process for removing oxygen from liquid argon, comprising the following cyclical steps:

a) supplying the adsorbent bed with the liquid argon feed that contains oxygen, thereby producing a purified liquid argon product leaving the adsorbent bed with less oxygen than existing in the liquid argon feed;

b) draining the purified residual liquid argon product and removing this residual out of the bed and;

c) allowing the adsorbent bed holding the adsorbent to warm to a temperature such that the absorbent is regenerated to the point that the adsorbent bed can continue to remove the oxygen and continue to provide the purified liquid argon once the adsorbent bed is cooled down as described in step (d) below.

d) cooling an adsorbent bed holding adsorbent to a temperature such that the adsorbent bed sustains an argon feed in a liquid phase.

The process described above is a cycle operated in a fashion comprising steps (a)-(d) where the cycle is repeated, as needed, and the adsorbent bed contains zeolite adsorbents of either the 4A type zeolites or ion exchanged 4A type zeolites or both and where the ion exchange is accomplished with lithium ions. According to an aspect of the invention, a TSA cyclic process for the purification of liquid argon is provided in combination with the development and use of specific and special adsorbents. The adsorbents contained within the adsorbent beds are effectively regenerated to remove oxygen via desorption by warming the beds with various gases (e.g., nitrogen, argon or gas mixtures including purified air) at temperatures that may reach ambient conditions.

Also, the adsorption process for removing oxygen from liquid argon, may be further described as follows:

a) supplying from the inlet of an adsorbent bed the liquid argon feed that contains oxygen in the concentration range of about 10 to 10,000 parts per million, adsorbing at least part of the oxygen on the adsorbent thereby producing a purified liquid argon product leaving the adsorbent bed from the outlet with less than or equal to 1 parts per million of oxygen;

b) supplying a nitrogen purge at the outlet of the adsorbent bed and draining from the inlet of the adsorbent bed purified residual liquid argon and;

c) continuing the nitrogen purge at the outlet of the adsorbent bed and allowing the adsorbent bed containing the adsorbent to warm to a temperature of at least 200 degrees Kelvin, desorbing at least part of the adsorbed oxygen and removing this from the inlet of the adsorbent bed and;

d) supplying a gaseous argon purge of at least 200 degrees Kelvin at the outlet of the adsorbent bed, so that the gaseous effluent at the inlet side of the adsorbent bed is predominantly argon;

e) indirectly cooling the adsorbent bed containing adsorbent, where the bed has an inlet and an outlet, as well as a direct and an indirect cooling means to a temperature below about 150 degrees Kelvin and;

f) directly cooling the adsorbent bed with purified liquid argon to a temperature such that the adsorbent bed sustains an argon feed in a liquid phase, such that g) the process steps (a)-(f) are repeated in a cyclical manner The economic advantages provided by the current invention include the reduction of capital cost of more conventional alternative technologies aimed at purifying liquid argon from oxygen impurities by use of adsorption processes. This reduction in capital cost is a result of the combination of an economically attractive adsorption process cycle, especially as it pertains to the regeneration step (e.g., elimination of any vacuum regeneration step), and the use of a synthetic zeolite material that does not require expensive reducing agents (e.g., hydrogen) to be regenerated.

BRIEF DESCRIPTION OF THE DRAWINGS

The objectives and advantages of the invention will be better understood from the following detailed description of the preferred embodiments thereof in connection with the accompanying FIGURE wherein like numbers denote the same features throughout The FIGURE illustrates the steps for a cyclic TSA process as provided in the exemplary embodiments of the present invention.

DETAILED DESCRIPTION OF THE INVENTION

The present invention relates to and describes a combination of an adsorption process cycle with specific adsorbents to efficiently purify a liquid argon stream into a stream that is primarily free from oxygen impurities, and methods of making and using the associated process and adsorbent bed.

More specifically, in the present invention, a TSA process has been developed, by which parts per million concentration levels of impurities of oxygen are removed from a liquid argon feed stream. The adsorbent for the TSA process has been selected and prepared so that the on-line time for each adsorbent bed is on the order of one week prior to any regeneration requirements. The purified liquid argon product should contain at most 10 parts per million of oxygen, and preferably less than or equal to 1 part per million of oxygen while the quantity of oxygen in the liquid feed is usually between 10 and 10,000 parts per million.

The bulk of the oxygen impurity adsorbed in the adsorbent is removed by increasing the temperature and using a suitable purge gas. The purge residual gas (e.g. argon, nitrogen, purified air) loading on the adsorbent, at the regeneration temperature, is substantially low such that the adsorbent, after cooling, is still able to remove significant amounts of oxygen from liquid argon streams in subsequent purification cycles.

The process includes several distinct process steps which are operated in sequence and repeated in a cyclical manner. Initially the impure (oxygen containing) cryogenic liquid argon is contacted with adsorbent during the purification or adsorption step, whereupon the oxygen impurities are substantially adsorbed by the adsorbent and a purified liquid argon product is obtained. Next, the oxygen contaminated liquid argon is drained from the adsorbent bed. After the draining of any residual cryogenic liquid is complete, the adsorbent bed is warmed to a predetermined temperature that allows for essentially complete regeneration of the adsorbent. Finally, cooling the regenerated adsorbent within the bed is provided in order that the purification process can begin again. These steps describe a single adsorption/purification cycle which is repeated as required.

Additionally, several key aspects of the cyclic adsorption/purification process are further described below. First, the process is preferably continuous and, therefore, the system requires at least two adsorbent beds; one of which carries-out the adsorption or purification step while another bed is being regenerated in preparation for a further adsorption or purification step. The choice of the number of beds required to keep the system operational and efficient is not limited and is dictated by system installation and process requirements and/or dictated by customer or application needs. It should be understood that the process described above often will include two or more adsorbent beds, wherein the process for purifying liquid argon in each bed is offset from one another. Specifically, for instance, when one adsorbent bed is being provided feed gas, a second adsorbent bed can be regenerating, a third adsorbent bed may be idle, and a fourth adsorbent bed may be cooling.

The purification step takes place at or below critical cryogenic temperatures to ensure the liquid state of argon feed persists at pressures in the range of 20-150 psig. However, purification at pressures higher than 150 psig, caused by a hydrostatic head pressure gain or pressurization of the feed using rotating equipment or a combination thereof, is an alternative way of practicing this invention. The oxygen level in the impure cryogenic liquid argon feed can range from as low as 10 parts per million to one or more thousand parts per million (preferably not more than 10,000 parts per million). The liquid argon feed is introduced at the bottom of the adsorbent bed. The purified liquid argon, collected at the top of the bed, is then subsequently sent to a holding product tank. The purification step is completed once the oxygen level in the liquid argon product reaches the desirable purification level of less than or equal to 10 parts per million and preferably less than or equal to 1 part per million of oxygen in argon.

Next, the bed is purged with an inert gas to drain the liquid contained in the adsorbent bed prior to regeneration. The inert purge gas can be either nitrogen, or argon or a mixture of both, or even purified air. The temperature of the inert gas is at least at the preferred gas boiling point and more preferably near ambient temperature, while its pressure is at least 2 psig and more preferably at least 15 psig. The draining step is completed once all the liquid that was contained in the adsorbent bed is drained.

Once the draining step is completed, the regeneration step is initiated. During this step, the temperature of the adsorbent bed increases as it is contacted with the purge gas until the bed temperature reaches at least 200 degrees Kelvin and more preferably around ambient temperature. The purge gas for the regeneration step is preferably either nitrogen or argon or a mixture of both. In cases where nitrogen and/or argon are less readily available other gases can be used to purge the adsorbent bed and regenerate the adsorbent including mixtures of dry carbon dioxide and hydrocarbon free air or a mixture of nitrogen and oxygen. Alternatively, the bed can be initially purged with nitrogen followed by an argon purge. The temperature of the purge gas is at least 120 degrees Kelvin and more preferably near ambient temperature, while the pressure is at least 2 psig and more preferably at least 15 psig. The temperature of the purge gas could be higher than ambient temperature, with the proviso that the porous adsorbent has enough thermal stability to withstand a higher temperature purge. In the most preferred embodiment, the purge gas is introduced from the top portion towards the bottom portion of the bed, in a direction counter current to the liquid feed stream. Purging the bed from the bottom portion to the top portion, in the same direction as the flow of the liquid to be purified are alternative embodiments which can accomplish similar results, with the proviso that the bed is below the fluidization limit or that the adsorbent and the bed is fully contained.

At the end of the regeneration step, the adsorbent bed reaches a temperature of at least 200 degrees Kelvin, and more preferably around ambient temperature. To proceed to the next purification cycle, the bed should be cooled to a temperature below the argon boiling point. One way to achieve this is via indirect cooling, i.e. by flowing liquid nitrogen (at a pressure ranging from about 18-30 psig) or cold gaseous nitrogen or liquid argon through a jacket surrounding the adsorbent vessel until the bed temperature, as measured at the center of the bed, has reached the preferred temperature. In one embodiment, this temperature is approximately 90 degrees Kelvin when the pressure of the liquid feed is about 60 psig. A most preferred way to achieve this is through a combination of two cooling steps. During the first step, indirect cooling is provided to the adsorbent bed, i.e. by flowing liquid nitrogen through a jacket surrounding the adsorbent vessel until the bed temperature, as measured at the center of the bed, has reached approximately 120 degrees Kelvin. Subsequently, during the second cooling step, the bed is cooled to approximately 90 degrees Kelvin by flowing liquid argon directly through the bed. This liquid argon stream could either be obtained from the impure liquid argon feed or from a portion of the purified liquid argon product, depending on the choice of design of the process. The subsequent purification step can be initiated once the bed has reached a temperature of 90 degrees Kelvin.

The development of a preferred cyclic cryogenic adsorption process depends to a high degree on the ability to warm and cool the absorbent bed within a specified and optimal time period. It will be understood by those skilled in the art that for a two-bed process, the time to drain the adsorbent bed and the heating (for adsorbent regeneration) and cooling time period also provides a key process variable and time frame for the "on-line time" of each absorbent bed. Furthermore, it is desirable from a process and economics standpoint to not cycle each bed very frequently. The preferable online time requirement for each bed is at least one week.

There are alternative process methodologies that could be used to practice the present inventive disclosure, however the most preferred embodiment is discussed below, with reference to the FIGURE.

For purposes of explanation and simplicity, the use of a single adsorbent bed is described and shown in the FIGURE. However, it will be understood by those skilled in the art, that the process described will be provided for two or more beds for the sake of the continuity of the process.

With reference to the exemplary embodiment of the FIGURE, the individual consecutive steps for a cyclic TSA process employed in the present invention are shown. In the initial stage of set-up, the absorbent bed (100) is tightly packed with adsorbent material (200). External cooling with liquid nitrogen is provided via a cooling jacket (300) that surrounds the bed. Stage (A) depicts the initial set-up arrangement prior to the beginning of purification, where the adsorbent bed is at about 90 degrees Kelvin. Stage (B) illustrates the purification step of the adsorption process. During Stage (B), the liquid argon stream containing oxygen is fed into the adsorbent bed as represented by the arrow (1). The feed is provided at the bottom of the bed. This feed stream (1) is liquid phase argon that contains oxygen impurities in the range of 10 to 10,000 parts per million of oxygen. The pressure within the bed during the introduction of the liquid argon feed is about 60 psig and the corresponding temperature for this exemplary embodiment ensured that the argon feed remained in the liquid phase at the respective process pressure conditions, namely a temperature of about 90 degrees Kelvin. The adsorbent is selected so that under the purification conditions, the absorbent is selective for oxygen. The liquid argon product stream (2) is collected at the top end of the bed. The purification step is completed once the level of oxygen in the liquid argon product reaches a concentration of 1 part per million. At this instance, the online bed should be prepared for regeneration and the second bed is brought online to perform the purification.

Prior to regeneration of the adsorbent, the liquid argon volume in the bed is drained as shown in Stage (C). In order to ensure that the bed is drained properly and in a timely fashion, a purge step is provided using an inert gas (normally either argon or nitrogen) denoted as stream (3). The temperature of the inert gas is about 300 degrees Kelvin, while its pressure is preferably about 15 psig. The draining step is completed once all the liquid that was contained in the adsorbent bed is drained. The liquid drain stream (4), as provided and shown, is rich in liquid argon that remained contaminated with oxygen and collected at the bottom of the bed. The liquid nitrogen was also drained from the cooling jacket and vented to the atmosphere.

After bed (100) is drained, the adsorbent is regenerated using a warm purge gas while the adsorbent remains within the same bed (100). As illustrated in Stages (D) and (E), a nitrogen purge through the bed was initiated in a countercurrent fashion in relation to the feed (i.e. from the top portion to the bottom portion of the bed). The temperature and pressure of the nitrogen purge gas, stream (5) and (7), is about 300 degrees Kelvin and 15 psig, respectively. The effluent during the purge Stage (D), indicated as stream (6), was predominantly composed of undesirable oxygen contaminant, and some argon in the nitrogen purge gas. During this step, oxygen is desorbed from the zeolite adsorbent and some quantity of argon is desorbed as the temperature within the absorbent bed rises. As the purging continues, and the bed temperature approaches the temperature of the purge gas (shown as nitrogen in stream (7)), the gaseous effluent, stream (8), becomes predominantly nitrogen (Stage (E)). The nitrogen purge is completed when the bed temperature reaches about 300 degrees Kelvin. At that point, the zeolite becomes loaded with nitrogen. To obtain optimum performance for the liquid argon purification process of this invention, it was necessary to leave most of the available sites of the adsorbent free and capable of capturing a majority of oxygen impurities. Hence, subsequent to the nitrogen gas purge, an argon gas purge, indicated by the stream (9) shown, is implemented (Stage (F)). The temperature of the gaseous argon for purge is about 300 degrees Kelvin, while the pressure is around 15 psig. This is a very important step in the regeneration of the adsorption scheme. During the last part of the regeneration step, (Stage (F)), a gaseous effluent of nitrogen and argon exits the bed (100), indicated by stream (10). The argon gas purge is completed when the effluent, stream (10) is predominantly argon gas. At this instance, the argon gas occupies the macropore space of the adsorbent particles as well as the void space between particles within the adsorbent bed.

Cooling the adsorbent begins in Stage (G). During this stage, indirect heat transfer from a liquid nitrogen medium flowing in a jacket (300) surrounding the bed (100) cooled the adsorbent bed to approximately 120 degrees Kelvin. The pressure of the liquid nitrogen in the jacket is regulated so that the liquid nitrogen temperature is above the melting point of argon at the process conditions and below the saturation point of nitrogen. Once the temperature in the middle of the adsorbent bed is about 120 degrees Kelvin, the direct cooling step is initiated, as shown in Stage (H). This involves direct contact of the adsorbent material (200) with a purified liquid argon stream denoted stream (11). Stream (11) is introduced at the bottom of the adsorbent bed and it cools the bed to the desired temperature for purification of about 90 degrees Kelvin. This also facilitates building a liquid head to fill the adsorbent bed with purified liquid argon. At the end of this step the temperature at the middle of the bed is about 90 degrees Kelvin and the pressure is around 60 psig. This allows for the next purification cycle to begin again at Stage (A).

Hence, in the context of the current invention, a full TSA purification cycle involves the following steps:

(i) providing the adsorbent bed with either virgin or regenerated adsorbent—Stage (A)

(ii) purification of the liquid argon feed providing making purified liquid argon product—Stage (B)

(ii) drainage of the liquid argon contained in the bed at the end of purification step—Stage (C)

(iii) regeneration of the adsorbent via warm-up—Stages (D), (E), and (F) and;

(iv) cool-down of the adsorbent bed—Stages (G) and (H) so that the cycle can be repeated.

In describing the adsorbent, it is instructive to understand the need for the proper adsorbent which will adsorb, at most, very small amounts of argon. The ideal adsorbent does not adsorb any argon and also removes impurities from the argon which are predominantly oxygen impurities. However, in practice, the adsorbents that have been used still have some argon uptake capacity. Herein are described adsorbents specifically designed to minimize argon uptake.

The adsorbents that were developed for the present invention are primarily beads (with predominantly spherical particle geometry) with an average particle size of less than or equal to 2.0 mm and more preferably less than or equal to 1.0 mm. Additionally, the desired adsorbents have a porosity that is in a range of between 33 and 40 percent as measured by mercury (Hg) porosimetry. A binder is used to formulate the beaded absorbent, such that the binder is present at no greater than 15 weight percent. This binder is preferably purified versions of attapulgite, halloysite, sepiolite or mixtures thereof.

Testing to establish the viability of this purification cycle was performed in a pilot plant which included an adsorbent bed with a tube-in-tube type cooling system. The inner tube, which had an outside diameter of one inch, was packed with the adsorbent. The outer jacket was utilized for passive cooling. The length of the bed was either one foot or three feet. This bed allowed for receiving cryogenic liquid flow into an inlet section and the delivery of a cryogenic liquid product at the outlet. The bed was regenerated on-line as is described above.

Description of the Oxygen Breakthrough Test:

Experiments were performed on the pilot plant scale in order to understand several factors associated with the importance of the adsorbent particle size and binder type in affecting the performance of the liquid argon purification of oxygen impurities. These are characterized as "breakthrough-type" experiments. The general methodology of a breakthrough test is well-known to those skilled in the art. For the purpose of the present invention, the breakthrough or working capacity for oxygen ($O_2$) was determined using an overall mass balance of oxygen in the feed and in the effluent streams at a predetermined oxygen concentration at the outlet. For the purpose of the present invention, this concentration is 1 part per million unless otherwise specified. The dynamic working capacity (or dynamic capacity) of the oxygen adsorbate was established here to represent the ability of the adsorbent to remove oxygen contaminants to a certain level. The dynamic capacity of oxygen was determined from the oxygen breakthrough test and was used as an indicator of the ability of the adsorbent to remove oxygen from the feed stream. The conditions of the test were carefully selected to critically evaluate adsorbents for the desired adsorption capability under realistic process conditions.

The oxygen dynamic capacity was calculated based on Equation (1):

$$\Delta O_2 = \frac{m_{in}}{w_s} \int_0^{t_b} (y_{in} - y_{out}) dt \quad (1)$$

Where:

$m_{in}$ is the molar feed flow into the bed $y_{in}$ and $y_{out}$ are the inlet and outlet mole fractions of oxygen respectively $w_s$ is the mass of adsorbent;

and;

$t_b$ is the breakthrough time corresponding to a predetermined breakthrough concentration (in this case—1 part per million oxygen unless otherwise specified).

The dynamic capacity inherently captures kinetic effects resulting from mass transfer resistance. For the purpose of this invention, the primary component in the liquid feed of the breakthrough test was argon. Because the concentration of argon in the feed stream was overwhelming in comparison to that of the oxygen concentration, the co-adsorption effect of oxygen upon argon was negligible. Conversely, the co-adsorption of argon might have had a significant effect upon the adsorption of oxygen. The breakthrough method, as described, was a preferred method for establishing the dynamic capacity for oxygen because argon co-adsorption and mass transfer effects were automatically incorporated into the resultant oxygen loading. Therefore, the preferred adsorbent is one that exhibits high oxygen dynamic capacity (long breakthrough times) in the presence of such inhibiting factors.

The following example is provided to demonstrate the capability of the TSA process, which demonstrates one embodiment of the present invention, i.e., to remove oxygen to concentrations of less than 1 part per million from a liquid argon stream that contains 10 parts per million of oxygen or more.

EXAMPLE 1

TSA Process Cycle Using Sample A

Preparation and Cool-down of Adsorbent Bed:

Sample A (266.58 g), a 42% lithium exchanged on an equivalent charge basis zeolite 4A, the development of which is described below (see Example 3), was loaded on a pilot plant bed. The length of the bed was three feet and the internal diameter of the bed was 0.88 inches. The bed was purged with gaseous nitrogen at 15 psig and 300 degrees Kelvin overnight. The nitrogen flow rate was 5 slpm. The gaseous nitrogen flow was discontinued and a gaseous argon purge was initiated at 15 psig and 300 degrees Kelvin with a gaseous argon purge time of no less than 20 min. The argon flow rate was 7.2 slpm.

Subsequent to the argon purge, the flow through the bed was discontinued and passive cooling of the bed was initiated by flowing liquid nitrogen into the jacket that surrounds the absorbent bed. The bed was cooled for at least 1 hour, or until the temperature as measured by a thermocouple in the middle of the bed, reached at least 120 degrees Kelvin. At this instant, purified liquid argon at 20 slpm was introduced from the bottom portion of the bed towards the top portion of the bed for at least a 45 minute period or until the bed temperature, as measured by the thermocouple reached 90 degrees Kelvin.

First Purification/Breakthrough Step:

When the bed temperature reached 90 degrees Kelvin, the liquid argon flow was discontinued and the introduction of a liquid argon stream with 99 parts per million of oxygen contaminant was initiated. The flow rate continued at 20 slpm.

The introduction of the contaminated liquid argon feed (with 99 parts per million of oxygen) into the adsorbent bed marked the beginning of the purification step (Stage (B) in the FIGURE). The flow direction of the liquid argon feed stream was from the bottom portion towards the top portion of the bed. After 17.1 hours, the oxygen concentration at the outlet of the bed reached 1 part per million. The dynamic capacity for this material for oxygen was calculated to be 1.13 weight percent corresponding to the breakthrough concentration of oxygen of 1 part per million. After 17.1 hours, the adsorbent and bed was ready for regeneration.

Drainage Step:

Following the end of the purification/breakthrough step above, the remaining liquid argon was pushed out of the bed by flowing nitrogen at 5 slpm (Stage (C) in the FIGURE). At the same time, gaseous nitrogen was allowed to flow in the jacket around the absorbent bed to initiate evaporation of the liquid nitrogen and transition to the following step, which is the warm regeneration.

Regeneration Step:

Following the completion of the drainage step, the regeneration step was initiated (Stage (D) in the FIGURE). The nitrogen purge was continued overnight and the pressure and temperature of the purge stream was kept at 15 psig and 300 degrees Kelvin respectively. After the gaseous nitrogen flow was discontinued, a gaseous argon purge was initiated at 15 psig and 300 degrees Kelvin with a gaseous argon purge time of no less than 20 minutes (Stage (F) in the FIGURE). The argon flow rate was 7.2 slpm.

Cool-down Step:

Subsequent to the argon purge, the flow through the bed was discontinued and passive cooling of the bed was initiated by flowing liquid nitrogen into the jacket that surrounds the absorbent bed (Stage (G) in the FIGURE). The bed was cooled for at least 1 hour, or until the temperature as measured by a thermocouple in the middle of the bed, reached 120 degrees Kelvin. At this instant, purified liquid argon at 20 slpm was introduced from the bottom portion of the bed towards the top portion of the bed for at least a 45 minute period or until the bed temperature, as measured by the thermocouple, reached 90 degrees Kelvin.

Second Purification/Breakthrough Step:

The adsorbent bed was now fully prepared for proceeding with the subsequent purification step. The concentration of oxygen in the liquid argon feed was kept at 100 parts per million. The concentration of the oxygen at the bed outlet was 1 part per million after 17.5 hours following introduction of the liquid feed into the bed. In this case, the dynamic capacity for oxygen was determined to be 1.21 weight percent at a breakthrough concentration of oxygen of 1 part per million.

In comparing the results from the first and second purification steps, it is clear that the regeneration step of the TSA process accomplished the goal of reducing and maintaining the oxygen level of the liquid argon product to below 1 part per million of oxygen over essentially the same period of time. Hence, the same purification performance was achieved in two consecutive cycles. This indicates that the ability of the adsorbent to remove oxygen from an oxygen contaminated liquid argon feed is fully restored after the described regeneration scheme is completed. After the regeneration step, the adsorbent still exhibits nearly the same oxygen capacity, thus confirming that the combination of the proper adsorbent with the proper process steps provides the desired resultant product using the process in a reproducible manner.

TABLE 1

Summary of Process Performance Data*

| Purification Step Before and After Adsorbent Regeneration | Initial Concentration of Oxygen Impurity (ppm) | Final Concentration of Oxygen Impurity (ppm) | Purification Step Time (hr) | $O_2$ Dynamic Capacity measured at 1 part per million (wt %) |
|---|---|---|---|---|
| 1st Purification | 99 | 1 | 17.1 | 1.13 |
| $2^{nd}$ Purification After Regeneration | 100 | 1 | 17.5 | 1.21 |

*The average particle diameter of the adsorbent was 1.0 mm and the process used is as described and shown in the FIGURE As shown by the data summarized in Table 1 above, the present disclosure and accompanying invention combines an advantageous adsorption process cycle with the adsorbent that has proper oxygen capacity and selectivity to efficiently purify a liquid argon stream contaminated with oxygen so that the oxygen levels are reduced and minimized to levels below 1 part per million. The cyclic TSA process is robust in that the oxygen dynamic capacity of the adsorbent remains essentially the same after subsequent regeneration of the adsorbent. The cyclic purification process is amenable with use of any adsorbent possessing the characteristics required to achieve the purification of the argon by removing oxygen.

The following example describes a TSA process for the purification of liquid argon from oxygen that is different than that described in Example 1 in that the regeneration step includes a warm nitrogen purge only, as opposed to a nitrogen purge followed by an argon purge (as described in Example 1).

EXAMPLE 2

Alternative TSA Process Cycle Using Sample A

Preparation and Cool-down of Adsorbent Bed:

The preparation and cool-down of the adsorbent bed was identical to that provided for Example 1, above. Sample A (92.24 g) was loaded on the pilot plant bed. The length of the bed for this example was one foot and the internal diameter of the bed was 0.88 inches. The bed was purged with gaseous nitrogen and argon as described in Example 1.

Subsequent to the argon purge, the flow through the bed was discontinued and passive cooling of the bed was initiated as described in Example 1. Following the passive cooling step, purified liquid argon at 40 slpm was introduced from the bottom portion of the bed towards the top portion of the bed for at least a 45 minute period or until the bed temperature, as measured by the thermocouple, reached 90 degrees Kelvin.

First Purification/Breakthrough Step:

When the bed temperature reached 90 degrees Kelvin, the liquid argon flow was discontinued and the introduction of a liquid argon stream with 1022 parts per million of oxygen contaminant was initiated. The flow rate continued at 40 slpm. The flow direction of the liquid argon feed stream was as described in Example 1. For Example 2, the capacity of the adsorbent bed at full breakthrough was calculated. This calculation was performed using Equation (1), above, where $t_b$ is now the time that corresponds to the full breakthrough, meaning the time when the oxygen concentration at the outlet of the bed reaches the inlet feed oxygen concentration (1022 parts per million, for the present example). Full breakthrough was achieved after 20.1 hours. The full bed capacity for oxygen was thus calculated to be 16 weight percent. Following the full breakthrough, the adsorbent and bed was ready for regeneration.

Drainage Step:

The adsorbent bed was drained from the remaining liquid argon as described in Example 1.

Regeneration Step:

Following the completion of the drainage step, the regeneration step was initiated (Stage (D) in the FIGURE). The nitrogen purge at a flow rate of 5 slpm was continued over a whole weekend and the pressure and temperature of the purge stream was kept at 15 psig and 300 degrees Kelvin respectively.

Cool-down Step:

Subsequent to the nitrogen purge, the flow through the bed was discontinued and passive cooling of the bed was initiated as described in Example 1. After the passive cooling step was completed, purified liquid argon at 40 slpm was introduced from the bottom portion of the bed towards the top portion of the bed for at least a 45 minute period or until the bed temperature, as measured by the thermocouple, reached 90 degrees Kelvin.

Second Purification/Breakthrough Step:

The adsorbent bed was now fully prepared for proceeding with the subsequent purification/breakthrough step. The concentration of oxygen in the liquid argon feed was kept at 997 parts per million. The concentration of the oxygen at the bed outlet 20 hours after the introduction of the liquid feed into the bed was that of the inlet (approximately 997 parts per million). The full bed capacity for oxygen was calculated to be 10.2 weight percent under the conditions described.

In comparing the results from the first and second full breakthrough steps, it is clear that the regeneration step of the TSA process did not accomplish the goal of restoring the initial adsorbent bed capacity for oxygen. The results reported showed a 36 percent decrease in the capacity of the adsorbent for oxygen following the regeneration method described in this example. This indicates that the regeneration scheme which involves a warm nitrogen purge only (as described in Example 2) is inferior and insufficient compared to the regeneration step which combines a warm nitrogen purge followed by a warm argon purge (as described in Example 1). Use of only the warm nitrogen purge does not fully restore the adsorbent bed capacity to remove the oxygen impurities in the subsequent purification step.

EXAMPLE 3

Preparation of Sample a (42% Lithium Exchange of Commercial 1.0 mm 4A+12% Actigel®)

A commercially produced zeolite 4A sample with 12% Actigel® in beaded form, having an average particle size of 1.0 mm was obtained from Zeochem LLC of Louisville, Ky. On a dry weight basis, 450 g of the commercially produced sample (562 g wet weight) was stirred in a lithium chloride (LiCl) solution (60.71 g LiCl crystals dissolved in 1500 ml deionized water) for 2 hours at a temperature of 90 degrees Centigrade. This exchange was repeated two more times. After the first two exchanges, the beads were decanted and washed by stirring in 2000 ml deionized water for 15 minutes at 90 degrees Centigrade. Decant and wash steps were repeated two more times. For the final washing step after the third exchange, the beads were placed in a 1.0 inch diameter glass column and using a peristaltic pump, 20 Liters deionized water were pumped through the column at rate of 80 ml/minute at 80 degrees Centigrade. The beads were removed, air dried, screened to the 16×20 mesh size, then activated using a shallow tray calcination method using a General Signal Company Blue M Electric oven equipped with a dry air purge. The adsorbents were spread out in stainless steel mesh trays to provide a thin layer less than 0.5 inch deep. A purge of 200 SCFH of dry air was fed to the oven during calcination. The temperature was set to 90 degrees Centigrade followed by a 360 minute dwell time. The temperature was then increased to 200 degrees Centigrade gradually over the course of a 360 minute period (approximate ramp rate=0.31 degrees Centigrade/minute), and then further increased to 300 degrees Centigrade over a 120 minute period (approximate ramp rate=0.83 degrees Centigrade/minute) and finally increased to 593 degrees Centigrade over a 180 minute period (approximate ramp rate=1.63 degrees Centigrade/minute) and held there for 45 minutes. The 1.0 mm (16×20 mesh) product was characterized by Hg porosimetry to assess porosity characteristics. Chemical analysis of the Li exchange product using standard ICP (Inductively Coupled Plasma Spectroscopy) methods known by those skilled in the art yielded a lithium exchange level of 42% for this sample on a charge equivalent basis.

The following examples provide additional information with regard to experimental evidence which eventually led to the present invention. The advantage of the adsorbents developed and employed versus those commercially available and described in the related art is also further developed herewithin.

EXAMPLE 4

Samples B and C (Commercial 2.0 mm and 1.7 mm Zeolite 4A)

Samples B and C were obtained from a commercial manufacturer. The zeolite is known as Zeochem Z4-04 and manufactured by Zeochem L.L.C of Louisville, Ky. They were manufactured using greater than 12 weight percent of a clay, non-Actigel® type binder. The average particle diameter of Samples B and C was 2.0 mm and 1.7 mm respectively.

EXAMPLE 5

Preparation of Sample D (Laboratory 0.6 mm Zeolite 4A from 3A Powder+12% Actigel® —Nauta Mixing)

Samples D was a zeolite 4A laboratory sample that contained 12 weight percent of Actigel®, a purified clay binder. This sample was prepared through ion exchange of a zeolite 3A product as described below.

On a dry weight basis, 2100.0 g of zeolite 3A powder (2592.6 g wet weight) was mixed with 286.4 g Actigel 208 (364.9 g wet weight) and 63.0 g F4M Methocel in a Hobart mixer for 1 hour and 35 minutes. The intermediate mixed powder from the Hobart mixer was transferred to a Nauta mixer having an internal volume of ~1 ft$^3$ and agitated therein at a speed of 9 rpm. Mixing with the Nauta device was continued, while gradually adding de-ionized water to form beads having porosity in the range 30 to 35 percent, as measured after calcination using a Micromeritics Autopore IV Hg porosimeter. At the end of this mixing period, beads in the target size 0.6 mm (20×40 mesh) were formed. The product beads were air dried overnight prior to calcination using the shallow tray method at temperatures up to 593 degrees Centigrade. The shallow tray calcination method described in Example 3 was used. The calcined beads were subjected to a screening operation to determine the yield. The particles in the 20×40 mesh size range were harvested for further processing, including the steps of hydration, sodium (Na) ion exchange, and activation up to 593 degrees Centigrade under dry air purge.

Sodium exchange of the samples (to a sodium exchange level of at least 99 percent sodium on an charge equivalent basis) was achieved using the following procedure: A column ion exchange process was used where the samples are packed inside a glass column (dimensions: 3-inch i.d.) contacted with sodium chloride solution (1.0 M) at 90 degrees Centigrade at a de-ionized water flow rate of 15 ml/min. A preheating zone before the adsorbent packed column ensured that the solution temperature had reached the target value prior to contacting the zeolite samples. A 5-fold excess of solution was contacted with the samples to yield products with sodium contents of at least 99 percent exchange and above. After the required amount of solution was pumped through the column containing the samples, the feed was switched to de-ionized water to remove excess sodium chloride (NaCl) from the samples. A de-ionized water volume of 50 L and flow rate of 80 ml/min was used. A silver nitrate (AgNO$_3$) test, familiar to those skilled in the art, was used to verify that the effluent was essentially chloride free, at the end of the washing stage. The wet samples were then dried, rescreened to 0.6 mm (Sample D), and activated under dry air purge (flow rate 200 SCFH) using the shallow tray calcination method described above.

EXAMPLE 6

Preparation of Samples E and F (Laboratory 1.0 mm and 0.6 mm Zeolite 4A from 4A Powder+12% Actigel® —Nauta Mixing)

Samples E and F were zeolite 4A laboratory samples that also contained 12 weight percent of the Actigel®binder, however these were prepared directly from a zeolite 4A powder. The samples were prepared using a Nauta mixer as described below.

On a dry weight basis, 2100.0 g of zeolite 4A powder (2592.6 g wet weight) was mixed with 286.4 g Actigel 208 (364.9 g wet weight) and 63.0 g F4M Methocel in a Hobart mixer for 1 hour and 35 minutes. The intermediate mixed powder from the Hobart mixer was transferred to a Nauta mixer having an internal volume of ~1 ft$^3$ and agitated therein at a speed of 9 rpm. Mixing using the Nauta device was continued, while gradually adding de-ionized water to form beads having porosity in the range 30 to 35 percent, as measured after calcination using a Micromeritics Autopore IV Hg porosimeter. At the end of this mixing period, beads, including those in the target 16×20 and 20×40 mesh size range had formed. The product beads were air dried overnight prior to calcination using the shallow tray method at temperatures up to 593 degrees Centigrade, as described in Example 3. The calcined beads were subjected to a screening operation to determine the yield. The particles that were harvested were 10 mm in size (16×20 mesh) for Sample E, and 0.6 mm in size (20×40 mesh) for Sample F. Next, the beads were activated under dry air purge (flow rate 200 SCFH) using the shallow tray calcination method as described above in Example 3.

Characterization of Samples of Different Size Using an Oxygen Breakthrough Test

Tests were conducted with different sized zeolite 4A samples to determine oxygen breakthrough under identical process conditions as described above. For the test data provided in Table 2, the system pressure was 60 psig and the temperature during the purification process was controlled at 90 degrees Kelvin. The feed flow rate was 90 standard liters per minute (slpm) and the bed length was three feet. The feed concentration into the adsorbent bed was targeted to be either 1000 or 100 parts per million of oxygen (contaminant) in the liquid argon stream as specified in Table 2. This target was not achieved in all cases due to insufficient experimental control.

TABLE 2

Oxygen Breakthrough Performance Data

| Adsorbent Sample Type | Adsorbent Average Diameter (mm) | Inlet O$_2$ Concentration in Liquid Argon Feed (ppm) | Outlet O$_2$ Concentration (ppm) | Purification Duration Time to Obtain Outlet Concentration of O$_2$ at Less than 1 part per million (minutes) |
|---|---|---|---|---|
| Sample B[1] | 2.0 | 925 | 722 | Not achieved |
| Sample C[1] | 1.7 | 910 | 403 | Not achieved |
| Sample D[2] | 0.6 | 983 | 0.17 | 20 |
| Sample C[1] | 1.7 | 90 | 31 | Not achieved |
| Sample E[2] | 1.0 | 100 | .03 | 43 |
| Sample F[2] | 0.6 | 100 | .02 | 131 |

[1] = Commercially available adsorbent
[2] = Laboratory prepared adsorbent

Table 2 shows that as the size of the absorbent material was reduced from 2.0 mm to 1.7 mm and then to 0.6 mm, the exit concentration of oxygen was reduced from 722 parts per million to 403 parts per million and then to 0.17 parts per million respectively, while the initial feed concentration was approximately 1,000 parts per million oxygen in liquid argon.

When the particle size of zeolite 4A was reduced to 0.6 mm (Sample D), the exit concentration of oxygen was 170 parts per billion and the bed allowed for purification of the liquid argon feed to below 1 part per million for a full 20 minute duration. Therefore, under the process conditions provided above, unless the zeolite 4A particle size is reduced to 0.6 mm, purifying liquid argon to less than 1 part per million oxygen, is not possible. These results indicate that the process of oxygen removal from a liquid argon stream is limited by the size of the absorbent material.

The same conclusion regarding the need to limit the size of the adsorbent can be reached when the feed concentration was initially set to approximately 100 parts per million of oxygen in liquid argon. Under these conditions, when the 1.7 mm zeolite 4A (Sample C) was used in the adsorbent bed, the outlet concentration of oxygen in liquid argon was reduced to 31 parts per million. When the 1.0 mm zeolite 4A (Sample E) was provided in the bed, purification of the liquid feed was achieved for a 43 minute duration. Finally, when the particle size of the 4A zeolite was reduced even more, to 0.6 mm (Sample F), the purification was extended to a 131 minute duration.

EXAMPLE 7

Preparation of Sample G (Laboratory 1.0 mm 4A Sample+12% Actigel®—Tilted Rotating Drum Mixing)

Sample G was another laboratory sample developed from zeolite 4A that also contained 12 weight percent of Actigel®. This sample was prepared using a tilted rotating drum mixer as described below.

On a dry weight basis, 9000.0 g of zeolite 4A powder (11029 g wet weight) was mixed with 1227.3 g Actigel 208 (1575.7 g wet weight) in a Simpson mixer-muller for 1 hour and 20 minutes. The mixed powdered intermediate mixed powder was transferred to a tilted rotating drum mixer having internal working volume of ~75 L and agitated therein at a speed of 24 rpm. Mixing of the formulation was continued while adding de-ionized water gradually to form beads. A recycling operation was performed, involving grinding-up and reforming the beads until the beads exhibited a porosity, as measured by using a Micromeritics Autopore IV Hg porosimeter on the calcined product, in the range of 30 to 35 percent. At the end of this mixing time period, beads including those in the target 1.0 mm size (16×20 mesh) range were formed. The product beads were air dried overnight prior to calcination using the shallow tray method at temperatures up to 593 degrees Centigrade, as earlier described in Example 3. The calcined beads were subjected to a screening operation to both determine the yield and so that those particles could be harvested in the 16×20 mesh size range. Finally, the adsorbent particles were activated under dry air purge (flow rate 200 SCFH) again using the shallow tray calcination method as earlier described in Example 3.

EXAMPLE 8

Preparation of Sample H (Commercial 1.0 mm 4A+15-20% Non-Actigel® Type Binders)

Sample H was obtained from a commercial manufacturer. This was the zeolite 4A known as Zeochem Z4-01 and manufactured by Zeochem L.L.C. of Louisville, Ky. It is manufactured using traditional clay non-Actigel® type binders at a content of 15 to 20 weight percent.

Effect of Binder Type and Content in Oxygen Capacity of Zeolite 4A

Table 3 provides additional oxygen breakthrough data. Here the laboratory prepared zeolite 4A with 12 weight percent Actigel clay binder of Example 7 (Sample G) is compared to a commercial zeolite 4A of Example 8 (Sample H). The flowrate of the pilot plant during the purification step was 20 slpm for these breakthrough tests. Both of the beaded adsorbent products, (Samples G and H), were 1.0 mm in diameter. The breakthrough tests were carried out at a temperature of 90 degrees Kelvin, and a pressure of 68 psig. The liquid argon feed originally contained 100 parts per million of oxygen.

TABLE 3

Pilot Plant Performance Data*

| Adsorbent Type | Binder Type | Binder % wt (Dry Weight Basis) | Breakthrough Time to 1 part per million $O_2$ (min) | $O_2$ Dynamic Capacity at 1 part per million (% wt) |
|---|---|---|---|---|
| Sample H[1] | Mixture of attapulgite, kaolin, bentonite | 15-20 | 267 | 0.33 |
| Sample G[2] | Actigel | 12 | 1022 | 1.17 |

*The average particle diameter of all adsorbents was 1.0 mm.
[1] = Commercially available adsorbent
[2] = Laboratory prepared adsorbent The importance of the binder type and content for the present process is confirmed by the above performance data shown in Table 3. The comparison clearly shows that the oxygen dynamic capacity of Sample G is 3.5× greater than that of Sample H and therefore provides improved process purification performance. Since the binder content of Sample G is approximately 6% less than that of Sample H, one would expect an improvement in the equilibrium adsorption capacity. However, the 3.5× improvement in the dynamic capacity shown for Sample G would not be predicted simply by the difference in binder content between the two materials.

EXAMPLE 9

Preparation of Sample I (42% Lithium Exchange of Laboratory 4A+12% Actigel®—Tilted Rotating Drum Mixing)

Sample I was prepared in a similar fashion to that of Example 7 (Sample G) and then, it was partially ion exchanged with lithium using the following procedure.

On a dry weight basis, 12.53 lbs. of zeolite 4A powder (16.06 lbs. wet weight) was mixed with 1.71 lbs. of Actigel 208 (2.14 lbs. wet weight) in a Littleford LS-150 plow mixer for 10 minutes. The plow mixed powdered intermediate powder mixture was transferred to a tilted rotating drum mixer having internal working volume of ~75 L and agitated therein at a speed of 24 rpm. Mixing of the formulation was continued while adding de-ionized water gradually to form beads. A recycling operation was performed, involving grinding-up and reforming the beads until the beads exhibited a porosity, which was measured using a Micromeritics Autopore IV Hg porosimeter on the calcined product, in the range of 30 to 35 percent. At the end of this mixing time period, beads—including those in the target 16×20 mesh size range, were formed. The product beads were then air dried overnight prior to calcination using the shallow tray method at temperatures up to 593 degrees Centigrade, as previously described in Example 3. The calcined beads were subjected to a screening operation, both to determine yield and also to harvest those particles that fell within the 16×20 mesh size range. The adsorbent particles were activated under dry air purge (flow rate 200 SCFH) using the same shallow tray calcination methods previously described.

Lithium ion exchange of the samples (to a Li ion exchange level of 42 percent on a charge equivalent basis) was achieved using the following procedure; a batch ion exchange process was used where 450 g of the sample on a dry weight basis was placed inside a glass beaker and stirred in a 1.5 L lithium chloride solution (0.95 M) at 90 degrees Centigrade for 2 hours. This was followed by stirring the sample in 2 Liters of de-ionized water at 90 degrees Centigrade for 15 minutes to remove excess lithium chloride. The exchange and wash process was repeated twice. Finally, the sample was packed in a glass column and washed with de-ionized water, similar to the procedure described in Example 3, to fully remove any excess lithium chloride. The wet samples were dried, rescreened to 16×20 sized mesh, and activated under dry air purge (flow rate 200 SCFH) again using the shallow tray calcination method described in Example 3.

Effect of Lithium Ion Exchange of Zeolite 4A in Process Performance

Evidence from testing indicates that argon also adsorbs in the micropores of zeolite 4A, but not as easily, and at a much lower observed rate than that of oxygen. The first experimental indication was obtained from single component McBain test data which showed a continuous increase in the argon uptake at 87 degrees Kelvin over 480 minutes during the adsorption test. Copending application entitled "Adsorbent Composition for Argon Purification" co-filed on Mar. 1, 2013 as Dckt. No. 13235 and incorporated herein by reference in its entirety, further describes the composition of the adsorbent(s) used in this process.

Breakthrough experiments under process relevant conditions have shown that the oxygen capacity of the 4A zeolite decreased by pre-exposing the freshly regenerated and indirectly cooled adsorbent to liquid argon. One purpose of these experiments was to simulate the conditions expected to occur for an industrial process utilizing a much longer adsorbent bed (e.g. 20 feet or more) rather than the prototype bed used in the pilot. When a much longer bed is utilized for the purification process, one skilled in the art understands that the portion of the bed close to the bed outlet is contacted with almost purified liquid argon for a long period of time (equal to the purification step time). Therefore, even if argon enters the micropores of the adsorbent at a much slower rate than oxygen, there is enough time at long cycle times, which are preferable for the current invention, for argon to adsorb at portions of the adsorbent bed close to the outlet. This argon adsorption on the adsorbent bed will in turn sacrifice the bed performance for oxygen adsorption. Hence, an adsorbent with minimum argon uptake is preferable. The experiments presented on Table 4 were performed in the pilot plant described above using a three foot long adsorbent bed. The process pressure and temperature during the purification stage of all tests were 67 psig and 90 degrees Kelvin, respectively. The feed flow rate was 20 slpm and the oxygen concentration in the argon stream was initially 100 parts per million.

TABLE 4

Pilot Plant Performance Data*

| Adsorbent | Percentage Lithium Ion Exchange | Pre-exposure time to liquid Ar (hr) | $O_2$ Dynamic Capacity at 1 part per million (wt %) |
|---|---|---|---|
| Sample G[2] | 0 | 1.0 | 1.07 |
| Sample G[2] | 0 | 48 | 0.35 |
| Sample I[2] | 42 | 1.0 | 2.5 |
| Sample I[2] | 42 | 48 | 2.0 |

*The average particle diameter of all adsorbents was 1.0 mm.
[2]= Laboratory prepared adsorbent Table 4 shows that, under these process conditions, the laboratory zeolite 4A sample (Sample G) lost 67 percent of its oxygen dynamic capacity after 48 hours of exposure to liquid argon prior to the oxygen breakthrough test. However, the 42 percent lithium exchanged laboratory zeolite A (Sample I) lost only 20 percent of its dynamic oxygen capacity after 48 hours of exposure to liquid argon prior to oxygen breakthrough testing. Therefore, the oxygen capacity is decreased to a much lesser extent following pre-exposure of a freshly regenerated and indirectly cooled 42 percent lithium exchanged 4A adsorbent to liquid argon than using a 4A adsorbent. If the adsorbent is not lithium ion exchanged, the adsorbent bed must be increased in size or a more frequent regeneration will be required to achieve the same argon purity results with the same process constraints. In addition, it has been determined that when the zeolite 4A is ion exchanged with 42 percent lithium on a charge equivalent basis (as for Sample I), the resulting material exhibits an increase in oxygen capacity.

Various modifications and changes may be made with respect to the foregoing detailed description and certain embodiments of the invention will become apparent to those skilled in the art, without departing from the spirit of the present disclosure.

What is claimed is:

1. An adsorption process for purifying a feed stream containing primarily liquid argon and oxygen employing an adsorbent exhibiting a faster rate of adsorption of oxygen and a slower rate of argon under the liquid argon feed conditions, comprising the following cycle of process steps:
   a) supplying from the inlet of an adsorbent bed said liquid argon feed that contains oxygen in an amount of more than 10 parts per million and less or equal to 10,000 parts per million, adsorbing at least part of the oxygen on the adsorbent, at or below cryogenic temperatures, thereby producing a purified liquid argon product leaving said adsorbent bed from the outlet with less than or equal to 10 parts per million oxygen present in said purified liquid argon product;
   b) draining from said adsorbent bed purified residual liquid argon by introducing a displacement purge gas;
   c) allowing said adsorbent bed containing said adsorbent to warm to a temperature, desorbing at least part of the adsorbed oxygen and removing said adsorbed oxygen from the adsorbent bed such that the liquid argon feed may be supplied for purposes of repeating the cycle;
   d) indirectly cooling said adsorbent bed having an inlet and an outlet and containing an adsorbent such that said adsorbent bed is indirectly cooled to a temperature below the boiling point of argon;

e) wherein said process steps (a)-(d) are repeated in a cyclical manner.

2. The process of claim 1, wherein the liquid argon feed for step (a) contains oxygen in the concentration range of about 10 parts per million and wherein removal of said oxygen from said liquid argon feed results in a purified liquid argon product with less than or equal to 1 parts per million of oxygen.

3. The process of claim 1, wherein the liquid argon feed temperature for step (a) is less than the boiling point of argon and the feed pressure is greater than or equal to 20 psig.

4. The process of claim 1, wherein the purified residual liquid argon is drained from the adsorbent bed in step (b) using a nitrogen purge.

5. The process of claim 1, wherein the purified residual liquid argon is drained from the adsorbent bed in step (b) using an argon purge.

6. The process of claim 1, wherein the warming of the adsorbent bed in step (c) is carried out by first removing the liquid nitrogen used for indirect cooling and subsequently by purging the adsorbent bed with gaseous nitrogen having a temperature of at least 200 degrees Kelvin and a pressure of at least 2 psig.

7. The process of claim 6, wherein the warming of the adsorbent bed in step (c) is continued until the adsorbent bed reaches a temperature of at least 200 degrees Kelvin.

8. The process of claim 7, wherein following the warming of the adsorbent bed, a gaseous argon purge having a temperature of at least 200 degrees Kelvin and a pressure of at least 2 psig is carried out until the effluent from the bed is predominantly argon.

9. The process of claim 1, wherein the warming of the adsorbent bed in step (c) is carried out by first removing the liquid nitrogen used for indirect cooling and subsequently by purging the adsorbent bed with gaseous argon having a temperature of at least 200 degrees Kelvin and a pressure of at least 2 psig.

10. The process of claim 9, wherein the warming of the adsorbent bed in step (c) is continued until the adsorbent bed reaches a temperature of at least 200 degrees Kelvin.

11. The process of claim 1, wherein cooling step (d) is carried out firstly by indirect cooling using liquid nitrogen until the adsorbent bed reaches a temperature of less than about 150 degrees Kelvin and subsequently by direct cooling using liquid argon wherein the cooling step is complete when the adsorbent bed, containing adsorbent, sustains the argon feed in a liquid phase.

12. The process of claim 11, wherein the liquid argon for use in cooling step (d) is at least partially recovered from said adsorbent bed during the purification step (a).

13. The process of claim 1, wherein the dynamic capacity of the adsorbent for oxygen to 1 part per million of oxygen of step (a) of subsequent adsorption cycles is at least 80 percent of said dynamic capacity of the adsorbent for oxygen for step (a) of the first adsorption process cycle.

14. The process of claim 1, further comprising a second adsorbent bed wherein said second adsorbent bed is operated such that it is purifying liquid argon feed in step (a) while the first adsorbent bed is being regenerated by steps (b), (c) and cooled by step (d) and correspondingly the second adsorbed bed is regenerated by steps (b), (c) and cooled by step (d) while said first adsorbent bed is purifying the liquid argon feed in step (a), so as to produce a purified liquid argon product stream continuously.

* * * * *